United States Patent
Roche et al.

(10) Patent No.: US 11,885,430 B2
(45) Date of Patent: Jan. 30, 2024

(54) ELECTROMECHANICAL VALVE AND METHOD OF ASSEMBLY

(71) Applicant: Walbro LLC, Tucson, AZ (US)

(72) Inventors: Bradley J. Roche, Millington, MI (US); William E. Galka, Caro, MI (US); David L. Speirs, Cass City, MI (US); Jeffrey C. Hoppe, Cass City, MI (US); Ernesto O. Basanez, Los Mochis (MX)

(73) Assignee: Walbro LLC, Cass City, MI (US)

( * ) Notice: Subject to any disclaimer, the term of this patent is extended or adjusted under 35 U.S.C. 154(b) by 85 days.

(21) Appl. No.: 17/291,447

(22) PCT Filed: Nov. 13, 2019

(86) PCT No.: PCT/US2019/061195
§ 371 (c)(1),
(2) Date: May 5, 2021

(87) PCT Pub. No.: WO2020/102364
PCT Pub. Date: May 22, 2020

(65) Prior Publication Data
US 2022/0003332 A1  Jan. 6, 2022

Related U.S. Application Data

(60) Provisional application No. 62/760,099, filed on Nov. 13, 2018.

(51) Int. Cl.
*F16K 31/06*  (2006.01)
*F16K 27/02*  (2006.01)

(52) U.S. Cl.
CPC ........ *F16K 31/0689* (2013.01); *F16K 27/029* (2013.01); *F16K 31/0655* (2013.01)

(58) Field of Classification Search
CPC ............. F16K 31/0689; F16K 31/0655; F16K 27/029; H01F 7/127
See application file for complete search history.

(56) References Cited

U.S. PATENT DOCUMENTS 4,947,893 A * 8/1990 Miller ................. F16K 31/0613
137/625.65
5,000,420 A * 3/1991 Hendrixon ............ H01F 7/1607
251/129.08
(Continued)

FOREIGN PATENT DOCUMENTS

CN       106415160 A    2/2017
EP         2282091 A1    2/2011
(Continued)

OTHER PUBLICATIONS

Written Opinion & International Search Report for PCT/US2019/061195 dated Mar. 5, 2020, 11 pages.
(Continued)

*Primary Examiner* — Matthew W Jellett
(74) *Attorney, Agent, or Firm* — Reising Ethington P.C.

(57) ABSTRACT

In at least some implementations, a method of assembling an electromechanical valve includes positioning the armature stop in a first position at a first distance from a valve seat, actuating the valve to move an armature away from the valve seat, providing a fluid flow to the valve, determining a fluid flow characteristic, and as a function of the fluid flow characteristic, moving the armature stop relative to the valve seat to a second position that is at a distance other than the first distance.

18 Claims, 3 Drawing Sheets

(56) References Cited

U.S. PATENT DOCUMENTS

| | | | | |
|---|---|---|---|---|
| 5,051,631 A * | 9/1991 | Anderson | ............ | F16K 31/406 |
| | | | | 251/129.08 |
| 5,060,695 A * | 10/1991 | McCabe | ............ | G05D 16/2097 |
| | | | | 137/625.61 |
| 5,301,921 A * | 4/1994 | Kumar | ............ | H01F 7/13 |
| | | | | 335/262 |
| 5,611,370 A * | 3/1997 | Najmolhoda | ......... | F16K 31/062 |
| | | | | 251/129.08 |
| 6,029,703 A * | 2/2000 | Erickson | ............ | F15B 13/0442 |
| | | | | 137/625.61 |
| 7,748,684 B2 | 7/2010 | Ito et al. | | |
| 7,766,037 B2 * | 8/2010 | Moenkhaus | ........ | F16K 31/0655 |
| | | | | 251/285 |
| 10,197,314 B2 | 2/2019 | Birkelund | | |
| 2005/0224739 A1 * | 10/2005 | Kish | ............ | F16K 31/0655 |
| | | | | 251/129.17 |
| 2013/0126768 A1 * | 5/2013 | Waterstredt | ............ | F16K 31/06 |
| | | | | 251/129.15 |
| 2014/0096839 A1 * | 4/2014 | Roedel | ............ | F16K 31/0658 |
| | | | | 137/15.18 |

FOREIGN PATENT DOCUMENTS

| | | |
|---|---|---|
| JP | S5771854 U | 5/1982 |
| JP | H01269769 A | 10/1989 |
| JP | 2013145057 A | 7/2013 |
| KR | 20080024204 A | 3/2008 |

OTHER PUBLICATIONS

CN Office Action for CN Application No. 201980074405.0 dated Mar. 31, 2023, (21 pages).

* cited by examiner

ELECTROMECHANICAL VALVE AND METHOD OF ASSEMBLY

REFERENCE TO RELATED APPLICATIONS

This application claims the benefit of U.S. Provisional Application Ser. No. 62/760,099 filed on Nov. 13, 2018 the entire contents of which are incorporated herein by reference in its entirety.

TECHNICAL FIELD

This disclosure relates to an electromechanical valve including a wire coil that when energized produces a magnetic field to drive an armature, and a method of assembling such a valve.

BACKGROUND

Valves, such as solenoid valves, may include a valve element or head that is moved relative to a valve seat when energy is provided to the valve to selectively permit fluid flow through the valve seat and/or out of an outlet of the valve. Due to tolerances in manufacturing and assembling the various components of the valve, the flow rate and/or pressure of fluid flowing out of the valve outlet may vary from one valve to the next across a production run of such valves.

SUMMARY

In at least some implementations, a method of assembling an electromechanical valve includes positioning the armature stop in a first position at a first distance from a valve seat, actuating the valve to move an armature away from the valve seat, providing a fluid flow to the valve, determining a fluid flow characteristic, and as a function of the fluid flow characteristic, moving the armature stop relative to the valve seat to a second position that is at a distance other than the first distance.

In at least some implementations, the step of moving the armature stop is accomplished by moving the armature stop without moving another component of the valve. In at least some implementations, the step of moving the armature stop is accomplished by moving a component to which the armature stop is coupled. In at least some implementations, the step of moving the armature stop is done while fluid is flowing through the valve. In at least some implementations, the step of moving the armature stop is done while fluid is not flowing through the valve, and the method further includes the step of determining the fluid flow characteristic after the armature stop has been moved.

In at least some implementations, the fluid flow characteristic is one or more of fluid flow rate through one or more outlets of the valve, fluid flow rate through one or more inlets of the valve, fluid pressure at one or more of the inlets and fluid pressure at one or more of the outlets.

In at least some implementations, the armature stop is press-fit to a portion of a housing and the step of moving the armature stop is accomplished by moving the armature stop relative to the portion of the housing or by moving the portion of the housing to which the armature stop is press-fit. The valve may include a housing and a cap, and the armature stop may be press-fit to the cap, and wherein the cap is coupled to the housing to close an open end of the housing. The valve may include a bobbin with a passage, the bobbin may be received within the housing and the armature may be received within the passage, and a portion of the armature stop may be received within the passage, and the step of moving the armature stop may be accomplished by moving the armature stop within the passage and relative to the bobbin.

In at least some implementations, a method of assembling an electromechanical valve includes positioning the armature stop in a first position at a first distance from a valve seat, actuating the valve to move an armature away from the valve seat, providing a fluid flow to the valve, determining a fluid flow characteristic, and moving the armature stop relative to the valve seat if the fluid flow characteristic is outside of a predetermined threshold for the fluid flow characteristic.

In at least some implementations, a housing is provided in which the armature is received and a cap is provided, and the method includes fitting the armature stop to the cap and assembling the cap to the housing to position the armature stop in the first position. The step of moving the armature stop may be accomplished by moving the cap relative to the housing, or by moving the armature stop relative to the cap, or both. The armature stop may be coupled to the cap by an interference fit and the step of fitting the armature stop to the cap may be accomplished by pressing the armature stop into an opening of the cap. The step of moving the armature stop may be accomplished by moving the armature stop linearly or by rotating the armature stop. In at least some implementations, the armature stop is farther from the valve seat in the first position than after the step of moving the armature stop.

BRIEF DESCRIPTION OF THE DRAWINGS

The following detailed description of certain embodiments and best mode will be set forth with reference to the accompanying drawings, in which.

DETAILED DESCRIPTION

Figure 1:
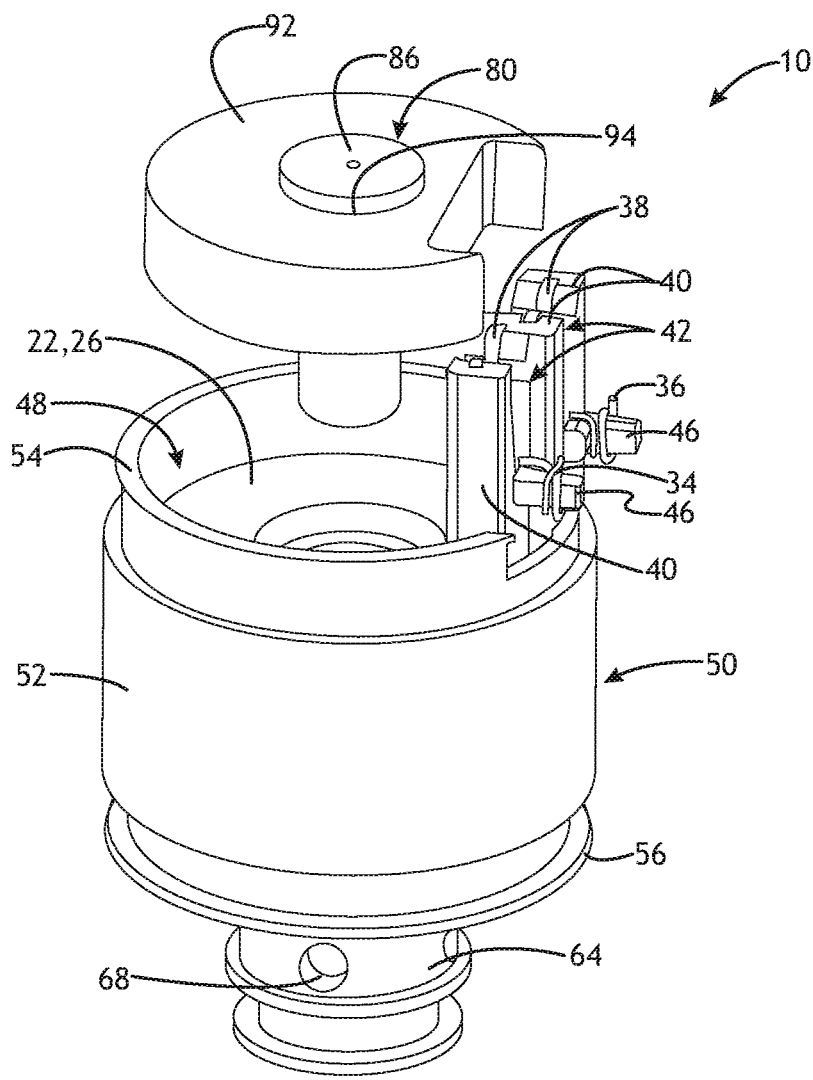
FIG. 1 is a perspective view of an electromechanical valve (e.g. a solenoid valve) showing a cap and an armature stop carried by the cap in a first position and removed from the valve.
Figure 3:
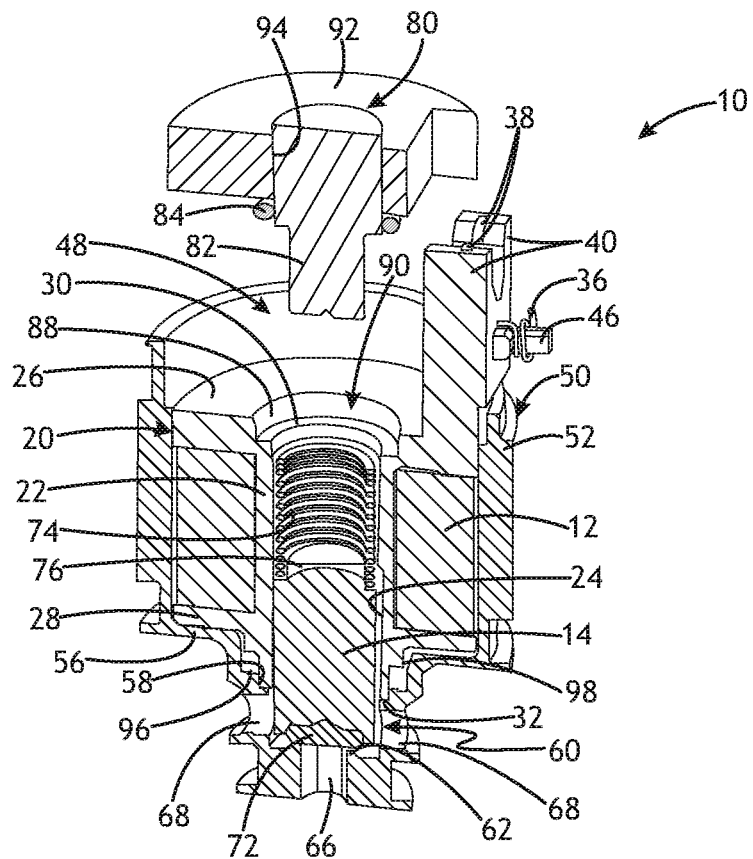
FIG. 3 is a sectional view of the valve of FIG. 1 showing the armature stop and cap in the same position as FIG. 1.
Figure 4:
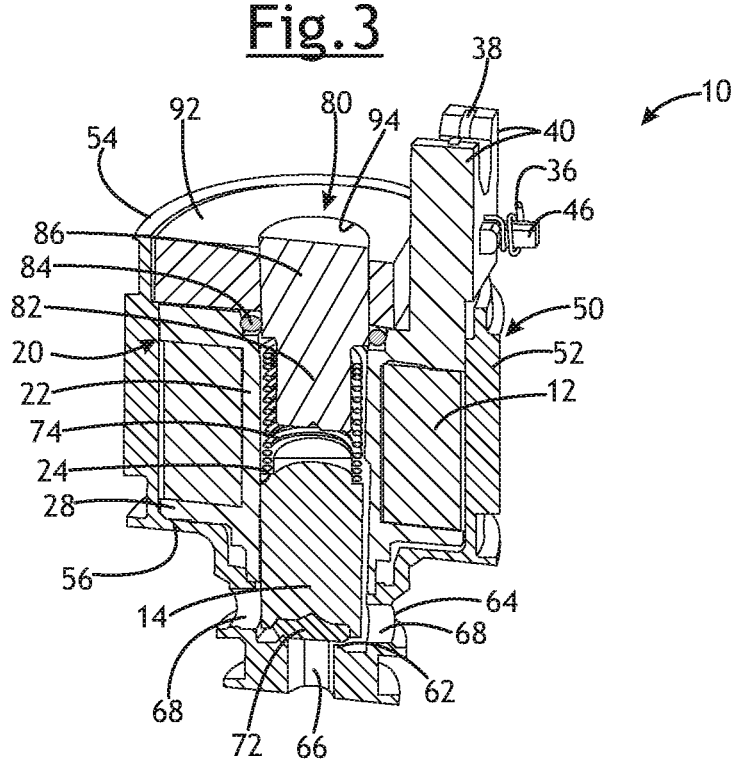
FIG. 4 is a sectional view of the valve showing the armature stop and cap fitted to the armature in a first assembly position.
Figure 5:
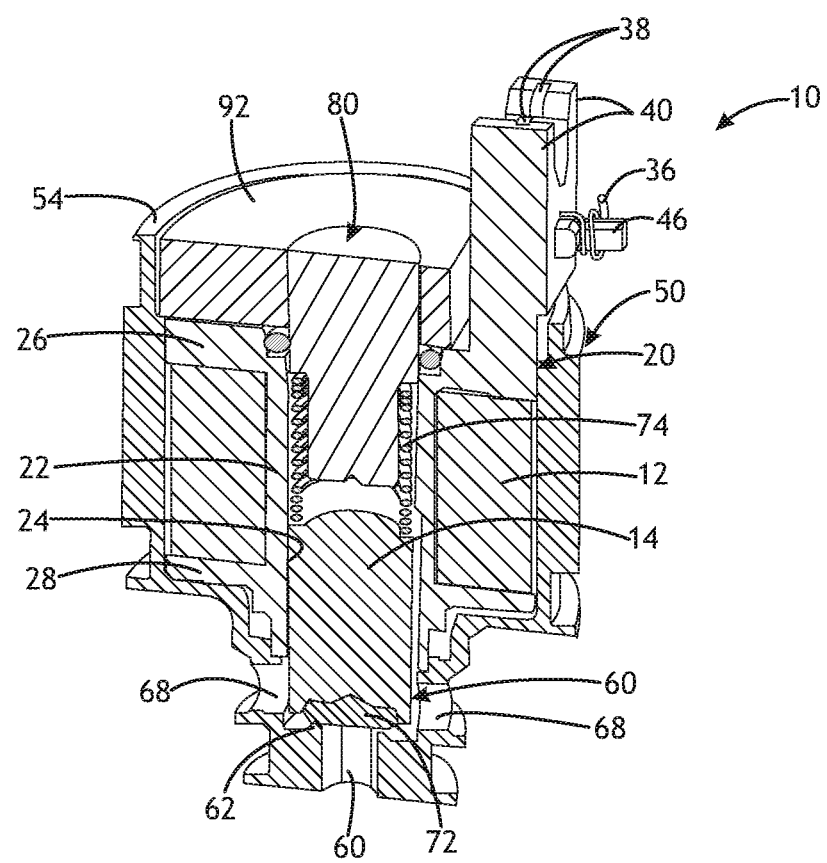
FIG. 5 is a sectional view of the valve in a final, assembled position.

Referring in more detail to the drawings, FIG. 1 illustrates an electromechanical valve 10 having a valve element driven between a first position to a second position to vary a flow rate of fluid through the valve. As shown in FIGS. 3-5, the valve 10 may be a so-called solenoid valve having a wire coil 12 that, when energized, generates a magnet field to drive an armature 14 that includes or moves the valve element between the first and second positions. The first position may be a closed position in which the fluid flow through the valve 10 (e.g. out of an outlet of the valve) is at a minimum flow rate which may include no flow. The second position may be an open position in which the fluid flow rate is greater than when the valve element is in the first position, and may include a fully open position wherein the flow rate is at a maximum value.

Figure 2:
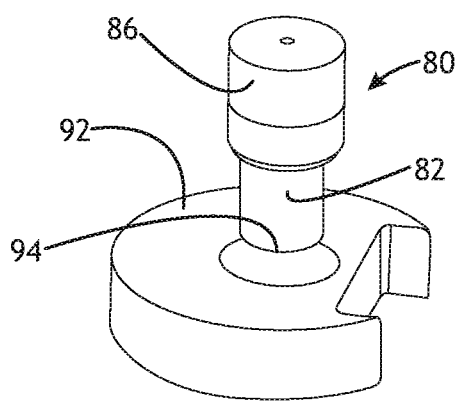
FIG. 2 is a perspective view showing the armature stop removed from the cap.

Referring to FIGS. 1-3, the solenoid valve 10 includes a bobbin 20 with a body 22 including an internal passage 24 having an axis, and spaced apart and radially outwardly extending flanges 26, 28. The passage 24 may be open to a first end 30 of the body 22 and extend toward or through an axially opposite second end 32 of the body. The passage 24 may be in the shape of a cylinder and may have a constant diameter, or the passage may be in a different shape and have a varying diameter or size along its axial length, as desired. The wire coil 12 is wrapped around the bobbin body 22 surrounding the passage 24, and ends 34, 36 (FIG. 1) of the coil 12 are arranged so that they may be coupled to terminals or other electrical contacts 38 suitable for coupling to a connector that is in turn coupled to a power source.

To receive or support electrical terminals that are coupled to the coil 12 and via which power is supplied to the valve 10, the bobbin body 22 may include terminal cavities or terminal supports 40 that receive or extend along electrical terminals or contacts 38, such as spade connectors or different electrical connector configurations. In the example shown, three upright supports 40 define between them two open areas 42 which may be defined in part by grooves formed in the uprights 40 in which projections from an electrical connector may be slidably received. The electrically conductive contacts 38 may be provided in at least part of the open areas 42 so that the contacts 38 are engaged in assembly by corresponding terminals that are also coupled to a power source. The ends 34, 36 of the coil 12 are electrically connected in any suitable way to the contacts 38 or terminals that are carried by the bobbin body 22. In the example shown, the ends 34, 36 of the coil 12 are also physically coupled to each of the contacts 38 and excess wire length may be wrapped around separate posts 46 that extend from or adjacent to two of the supports 40. Of course, the terminals or electrical connector arrangement of the solenoid valve 10 may be arranged in any suitable way and the illustrated example is just one possibility. The body 22 and electrical connector arrangement (e.g. the supports 40) may be integrally provided in the same component and may be formed in the same piece of material such as by a molding process.

As shown in FIGS. 3-5, the bobbin 20 including the coil 12 may be received within a cavity 48 of a housing 50. The housing 50 may have a sidewall 52 that may be generally cylindrical, open at one end 54 and may be generally closed at its other end at least in part by a base 56 that extends inwardly from the sidewall 52. The base 56 may include an opening 58 that is aligned with the passage 24 in the bobbin body 22. A fluid passage 60 including or defined at least in part by a valve seat 62 may be formed in the housing 50. The valve seat 62 may be aligned with the opening 58 and passage 24 and may be defined by an integral portion of the housing 50 surrounding part of the fluid passage 60.

The fluid passage 60 may extend into and be defined at least in part by a cylindrical boss 64 or reduced diameter portion extending from the base 56. The valve seat 62, at least one inlet 66 and at least one outlet 68 of the fluid passage 60 may be defined in the boss 64 or elsewhere by the housing 50, or by a different component adjacent to the solenoid valve 10. In at least some implementations, the inlet 66 is defined by an open end of the boss 64 and may be axially aligned with the opening 58, passage 60 and valve seat 62. The inlet 66 defines a portion of the fluid passage 60 that is upstream of the valve seat 62 and through which fluid enters the housing 50. Downstream of the valve seat 62, one or more fluid outlets 68 may be provided in the housing 50 and fluid exits the housing 50 through the outlets 68. Of course, fluid may flow through the valve in the opposite manner, that is, into the passage 60 via the port(s) 68 and out of the passage 60 via the port(s) 66 (that is, what is termed an outlet herein may instead be an inlet and what is termed an inlet herein may instead be an outlet). The boss 64 may be generally cylindrical and arranged to be fitted within a fluid passage or complementarily shaped chamber of a component in which control of the flow of a fluid is desired. The valve seat 62 may face axially toward the bobbin 20 and its passage 24 and may have at least a portion that is radially smaller than the bobbin passage 24 (e.g. extends inwardly relative to and/or provides a shoulder in or adjacent to the internal passage). The housing 50 may be formed from metal and may define part of the magnetic flux path of the solenoid valve 10 as will be described. The housing can be formed in any desired number of components and/or configurations.

To control fluid flow through the valve seat 62, the armature 14 is slidably received in the bobbin passage 24 and or fluid passage 60 and may open and close, or control the opening and closing of, the valve seat 62 as the armature 14 is driven by the solenoid. The armature 14 or at least a portion thereof may be ferromagnetic and is driven from a first position to a second position when electricity is provided to the coil 12. In at least some implementations, fluid flow through the valve seat 62 is inhibited or prevented when the armature 14 is in the first position and a greater fluid flow rate is permitted through the valve seat 62 when the armature 14 is in the second position. To improve the sealing/closing of the valve seat 62 when desired, a valve member 72 may be provided within the fluid passage 60, either connected to the armature 14 for movement with the armature 14 or received in the passage 60 independently of the armature. In implementations in which the valve member 72 is independently received within the passage 60, the valve member 72 may act as a check valve to prevent reverse flow from the outlet(s) 68 to the inlet(s) 66 and it may improve closing and sealing of the valve seat 62. The valve member 72 may be formed from any suitable material and may be generally circular and sized for receipt in the fluid passage 60 and to engage the valve seat 62. Or the armature 14 may directly engage the valve seat 62 without any separate valve member 72 provided.

A biasing member, such as a spring 74 may be received within the bobbin passage 24 and have one end engaged with the armature 14, which may have a reduced diameter at end 76 over which a portion of the spring 74 is received. The spring 74 biases the armature 14 toward the valve seat 62 so that the valve member 72 is normally engaged with the valve seat 62 and the valve 10 is normally closed. That is, unless the armature 14 is moved away from the valve seat 62 by a magnetic force generated by the solenoid, the spring 74 urges the armature 14 into the valve member 72 which engages and closes the valve seat 62 to inhibit or prevent fluid flow through the valve seat 62.

To control the spring force acting on the armature 14 (e.g. provide a desired compression of the spring 74) and/or to define the second position of the armature 14 (e.g. by limiting movement of the armature 14 away from the valve seat 62), an armature stop 80 is aligned with and may be provided at least partially within the bobbin passage 24. The armature stop 80 may close the open end of the bobbin passage 24, provide a reaction surface for the spring 74 and a stop surface that may be engaged by the armature 14 to limit its travel. The armature stop 80 may include a spring retention feature, such as a reduced diameter stem 82 at one end that is received within the spring 74 and within the passage 24. The spring 74 could otherwise be retained between the armature 14 and armature stop 80, such as by having ends of the spring received within cavities in the adjacent ends of these components. In the example shown, a seal, such as an O-ring 84, is received around an enlarged head 86 of the armature stop 80, which may include a groove for the seal 84. The bobbin body 22 may in turn include a sealing surface 88 engaged by the seal 84 in assembly, as shown in FIGS. 3-5 wherein the sealing surface 88 is defined within an annular cavity 90 surrounding the passage 24. The sealing surface 88 may be axially outboard of the passage 24, or it could be defined by a surface of the passage in the bobbin body 22, as desired. The stem 82 may extend from the head 86 which may be sealed to the bobbin body 22 to inhibit or prevent fluid leaking from the passage 24.

The armature stop 80 may be carried by the bobbin body 22 and/or the housing 50, such as by a second portion of the housing shown as a cap 92 that is fitted to and closes the open end of the main portion of the housing 50. The head 86 may include retention features, such as outwardly extending barbs or one or more ribs to engage the cap 92 (and/or bobbin) and maintain the position of the armature stop 80 relative to the cap 92.

The cap 92 may be complementary in shape to the upper end of the housing 50 and bobbin 20, and may be press-fit or otherwise fixed to the housing 50, such as by one or more fasteners, clips, adhesive, weld, threads or heat stake, as desired. If desired, the bobbin body 22 may be firmly trapped between the cap 92 and base 56 to, among other things, maintain a consistent position of the bobbin 20 and reduce vibrations between the bobbin 20 and housing 50. In the example shown, the flanges 26, 28 may be received against the cap 92 and base 56. The cap 92 may include an opening 94 aligned with the bobbin passage 24 and into which the armature stop 80 is at least partially received. The opening 94 may be sized for an interference fit with the head 86 of the armature stop 80 to enable a desired position of the armature stop 80 relative to the cap 92 to be maintained. While the head 86 and opening 94 are shown as being cylindrical, they may be of any desired shape and size. Alternatively, the armature stop 80 and cap 92 may be integrally formed in a single body, or the cap may be overmolded to the armature stop so that they are integrated as a single component.

In assembly, the armature stop 80 can be initially fitted to the cap 92 in a first position in which the armature stop 80 is only partially pressed into the cap 92, as shown in FIGS. 1, 3 and 4. Then, the cap 92 and partially pressed armature stop 80 can be fitted to the housing 50 as shown in FIG. 4. Alternatively, the cap 92 can be fitted to the housing 50 before the armature stop 80 is pressed into the cap 92 to the first position. In the first position, the armature stop 80 extends into the bobbin passage 24, the armature 14 is received between the armature stop 80 and the valve seat 62, the spring 74 is received between the armature stop 80 and the armature 14, and the armature stop 80 engages the spring 74 to at least somewhat compress the spring and provide a biasing force on the armature 14. The seal 84 may also engage the bobbin sealing surface 88 to provide a fluid tight seal between the armature stop 80 and the bobbin body 22. The press-fit between the armature stop 80 and cap 92 may provide a fluid-tight seal between them. And a seal 96 may be provided between the bobbin body 22 and the housing 50, such as between the flange 28 and base 56 or between a projection 98 of the bobbin body 22 that is received within the boss 64. Thus, even though the armature stop 80 is not (or might not be) in its final position, all fluid seals may be in place, if desired.

With the armature stop 80 in the first position and the cap 92 fitted to the housing, the solenoid valve 10 can be connected to an electric power source and to a fluid source which may provide a gaseous or liquid flow to the inlet 66 of the solenoid valve 10. The power and fluid sources may be part of a fixture or bench and the solenoid valve 10 may be temporarily connected to the bench to permit calibration of the valve. Or the power and fluid sources could be part of a final assembly that includes the solenoid valve 10 (e.g. this could be the final installed position of the solenoid valve for its intended end use). That is, the solenoid valve 10 can be calibrated prior to final installation of the valve for its intended end use or while in its final installation position.

To calibrate the valve 10, the coil 12 is energized and the resulting magnetic field displaces the armature 14 from the valve seat 62 and toward the armature stop 80. Travel of the armature 14 may be limited by direct engagement of the armature 14 with the armature stop 80 (e.g. contact with the free end of the stem 82), or by compression of the spring 74 to the point where the spring force is equal to the force of the magnetic field on the armature 14. With the armature 14 displaced from the valve seat 62, fluid may be provided to the inlet 66 and the fluid flow out of the outlet(s) 68 may be determined. Because the armature stop 80 is not fully pressed into the cap 92, it may be in the first position that is farther from the valve seat 62, and the armature 14 is thereby permitted to move farther from the valve seat 62 than is ultimately desired. As a result, the fluid flow through the outlet(s) 68 is greater than ultimately desired. To reduce the outlet fluid flow, the armature stop 80 is pressed further toward the armature 14 and valve seat 62 (e.g. the armature stop 80 is moved relative to the cap 92 which does not move) to reduce the distance of the armature 14 from the valve seat 14 when the armature is in the second position, as shown in FIG. 5. In at least some implementations, this may be done while the fluid flow is actively being provided to the valve 10 and while the coil 12 is energized. Alternatively, fluid flow may be stopped before the armature stop 80 is pressed further, and then the fluid may be provided again after the pressing to determine if the desired outlet flow rate is achieved with the then current armature stop position.

Accordingly, the second position of the armature 14 is controlled by the position of the armature stop 80 which may be adjusted on each individual solenoid valve 10 to provide a desired flow rate. In a production run of solenoid valves 10, there are variances in the parts that make up the solenoid valve. Controlling the armature position as a function of the actual flow rate of fluid through the solenoid valve 10 rather than as a function of a predetermined position of the armature stop 80 can greatly reduce or eliminate the variances in output flow rate from the solenoid valves across a production run of the valves.

Thus, the assembly method for the solenoid valve 10 may include positioning the armature stop 80 in a first, calibration position wherein greater than desired armature movement away from the valve seat 62 is permitted. The method may further include moving the armature stop 80 toward the armature 14 and valve seat 62 to a second, calibrated position in which a desired fluid flow rate from the solenoid valve 10 is obtained. Of course, the fluid flow rate may be a range of flow rates rather than an exact number and the range may be determined at one or more inlet fluid conditions (e.g. flow rate and pressures). In addition to or instead of moving the armature stop 80 relative to the cap 92, the cap 92 may be moved relative to the housing 50 or bobbin 20 which effectively moves the armature stop 80 toward the armature 14. Thus, the assembly step of moving the armature stop 80 toward the armature 14 or valve seat 62 may be achieved by moving a component to which the armature stop 80 is coupled (e.g. the cap with which it may be integrated or integrally formed), or a component that otherwise causes such movement of the armature stop 80. Further, while the armature or cap may be linearly moved relative to the valve seat, this may be accomplished by rotating the cap relative to the housing, or rotating the armature stop relative to the cap with, for example, threads providing axial displacement of the rotated component to change the position of the armature stop relative to the valve seat. Rotation in one direction may move the armature stop toward the valve seat and rotation in the opposite direction may move the armature stop away from the valve seat.

Further, while the above assembly method described a first position of the armature stop 80 that was at a first distance from the valve seat 62, and a second position that was closer to the valve seat 62 than the first position, the reverse could be true. That is, the armature stop 80 may be initially positioned closer to the valve seat 62 than the desired final position and thereafter moved away from the valve seat 62. Or, the armature stop 80 could be initially provided in a first position that is intended to provide a desired flow rate from the valve 10 and thereafter moved only if the flow rate is determined to be different than desired. Still further, instead of measuring outlet flow rate, one or more different fluid flow characteristic(s) may be determined and the final position of the armature stop chosen as a function of the fluid flow characteristic. For example, the pressure at the outlet(s), pressure at the inlet or upstream of the inlet, pressure drop across the valve seat (e.g. difference in pressure between inlet and outlet) may be used instead of or in addition to fluid outlet flow rate or inlet flow rate. Thus, a method may include a step of moving the armature stop 80 relative to the valve seat 62 if a fluid flow characteristic is outside of a predetermined threshold for the fluid flow characteristic, where the threshold may be a minimum value, maximum value or a range of values for the one or more fluid flow characteristics. The valve 10 may be used in a wide-range of applications to control liquid and/or gaseous flow, such as but not limited to controlling fuel or air flow in a combustion engine application (e.g. controlling fuel and/or air flow in a carburetor, or as a fuel injector through which pressurize fuel is provided to an engine).

It is to be understood that the foregoing description is not a definition of the invention, but is a description of one or more preferred embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, a method having greater, fewer, or different steps than those shown could be used instead. All such embodiments, changes, and modifications are intended to come within the scope of the appended claims.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A method of assembling an electromechanical valve, comprising:
    positioning an armature stop in a first position at a first distance from a valve seat, with an armature between the armature stop and the valve seat;
    actuating the electromechanical valve to move the armature away from the valve seat and into engagement with the armature stop;
    providing a fluid flow to the electromechanical valve;
    determining a fluid flow characteristic; and
    as a function of the fluid flow characteristic, moving the armature stop relative to the valve seat to a second position that is at a distance other than the first distance, wherein the armature stop is press-fit to a portion of a housing and the step of moving the armature stop is accomplished by pressing and slidably moving the armature stop relative to the portion of the housing or by pressing and slidably moving the portion of the housing to which the armature stop is press-fit.

2. The method of claim 1 wherein the step of moving the armature stop is accomplished by moving the armature stop without moving another component of the valve.

3. The method of claim 1 wherein the step of moving the armature stop is accomplished by moving a component to which the armature stop is coupled.

4. The method of claim 1 wherein the step of moving the armature stop is done while fluid is flowing through the valve.

5. The method of claim 1 wherein the step of moving the armature stop is done while fluid is not flowing through the valve, and the method further includes the step of determining the fluid flow characteristic after the armature stop has been moved.

6. The method of claim 1 wherein the fluid flow characteristic is one or more of fluid flow rate through one or more outlets of the valve, fluid flow rate through one or more inlets of the valve, fluid pressure at one or more of the inlets and fluid pressure at one or more of the outlets.

7. The method of claim 1 wherein the valve includes a housing and a cap, and the armature stop is press-fit to the cap, and wherein the cap is coupled to the housing to close an open end of the housing.

8. The method of claim 7 wherein the valve includes a bobbin with a passage, the bobbin is received within the housing and the armature is received within the passage, and a portion of the armature stop is received within the passage, and the step of moving the armature stop is accomplished by moving the armature stop within the passage and relative to the bobbin.

9. A method of assembling an electromechanical valve, comprising:
    positioning an armature stop in a first position at a first distance from a valve seat, with an armature between the armature stop and the valve seat;
    actuating the electromechanical valve to move the armature away from the valve seat and into engagement with the armature stop;
    providing a fluid flow to the electromechanical valve;
    determining a fluid flow characteristic; and
    moving the armature stop relative to the valve seat if the fluid flow characteristic is outside of a predetermined threshold for the fluid flow characteristic, wherein the step of moving the armature stop is accomplished by pressing and slidably moving the armature stop relative to the portion of the housing or by pressing and slidably moving the portion of the housing to which the armature stop is press-fit.

10. The method of claim 9 which includes providing a housing in which the armature is received and providing a cap, fitting the armature stop to the cap and assembling the cap to the housing to position the armature stop in the first position.

11. The method of claim 10 wherein the step of moving the armature stop is accomplished by moving the cap relative to the housing, or by moving the armature stop relative to the cap, or both.

12. The method of claim 9 wherein the step of moving the armature stop is accomplished by moving the armature stop linearly.

13. The method of claim 9 wherein the armature stop is farther from the valve seat in the first position than after the step of moving the armature stop.

14. The method of claim 10 wherein the armature stop is coupled to the cap by an interference fit and the step of fitting the armature stop the cap is accomplished by pressing the armature stop into an opening of the cap.

15. A method of assembling an electromechanical valve, comprising:
providing a housing having a cavity and a valve seat;
inserting a bobbin including a wire coil into the cavity, the bobbin defining a passage aligned with the valve seat;
inserting an armature into the passage such that the armature is movable relative to and engageable with the valve seat;
positioning an armature stop relative to the passage in a first position at a first distance from the valve seat, with the armature between the armature stop and the valve seat and with the armature stop positioned to be engaged by the armature at an end of travel of the armature;
actuating the electromechanical valve by providing electricity to the wire coil to move the armature away from the valve seat and into engagement with the armature stop;
providing a fluid flow to the electromechanical valve;
determining a fluid flow characteristic of the fluid flow into or out of the valve; and
as a function of the fluid flow characteristic, moving the armature stop relative to the valve seat to a second position that is at a distance other than the first distance, wherein the armature stop is press-fit to a portion of a housing and the step of moving the armature stop is accomplished by pressing and slidably moving the armature stop relative to the portion of the housing or by pressing and slidably moving the portion of the housing to which the armature stop is press-fit.

16. The method of claim 15 which includes providing a cap, fitting the armature stop to the cap and assembling the cap to the housing to position the armature stop in the first position.

17. The method of claim 16 wherein the step of moving the armature stop is accomplished by moving the cap relative to the housing, or by moving the armature stop relative to the cap, or both.

18. The method of claim 16 wherein the armature stop is coupled to the cap by an interference fit and the step of fitting the armature stop the cap is accomplished by pressing the armature stop into an opening of the cap.

\* \* \* \* \*